United States Patent
Potyrailo et al.

(10) Patent No.: US 8,207,827 B2
(45) Date of Patent: Jun. 26, 2012

(54) METHODS AND SYSTEMS FOR SENSING UPON RADIATION EXPOSURE

(75) Inventors: Radislav Alexandrovich Potyrailo, Niskayuna, NY (US); William Guy Morris, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 530 days.

(21) Appl. No.: 12/503,626

(22) Filed: Jul. 15, 2009

(65) Prior Publication Data

US 2011/0012736 A1 Jan. 20, 2011

(51) Int. Cl.
*H04Q 5/22* (2006.01)

(52) U.S. Cl. ............. 340/10.41; 340/10.4; 340/572.4; 235/375; 324/633; 422/82.01

(58) Field of Classification Search .......... 340/10.41, 340/10.4, 572.4; 235/375; 324/633; 422/82.01
See application file for complete search history.

(56) References Cited

U.S. PATENT DOCUMENTS

| | | | |
|---|---|---|---|
| 7,038,470 B1 * | 5/2006 | Johnson | 324/664 |
| 7,218,232 B2 | 5/2007 | DiSilvestro et al. | |
| 7,319,396 B2 * | 1/2008 | Homanfar et al. | 340/572.1 |
| 2002/0070862 A1 * | 6/2002 | Francis et al. | 340/572.1 |
| 2005/0016276 A1 * | 1/2005 | Guan et al. | 73/579 |
| 2005/0215901 A1 | 9/2005 | Anderson et al. | |
| 2006/0127154 A1 * | 6/2006 | Barrus et al. | 400/76 |
| 2006/0176152 A1 | 8/2006 | Wagner et al. | |
| 2006/0183984 A1 | 8/2006 | Dobbles et al. | |
| 2006/0241399 A1 | 10/2006 | Fabian | |
| 2007/0104993 A1 * | 5/2007 | Lee et al. | 429/33 |
| 2007/0293820 A1 | 12/2007 | Dacquay et al. | |
| 2008/0021307 A1 | 1/2008 | Freeman et al. | |
| 2008/0024310 A1 | 1/2008 | Baker et al. | |
| 2008/0042837 A1 | 2/2008 | Burke | |
| 2008/0136643 A1 | 6/2008 | Yeo et al. | |
| 2009/0121872 A1 * | 5/2009 | Lynch et al. | 340/572.1 |

FOREIGN PATENT DOCUMENTS

| | | |
|---|---|---|
| EP | 1605392 A1 | 12/2005 |
| EP | 1887581 B1 | 12/2008 |
| WO | 2011008157 A1 | 1/2011 |

OTHER PUBLICATIONS

Ken Baker; "AdvantaPure Introduces the Only Read/Write RFID Tag That's Gamma-Radiation Resistant"; Nov. 30, 2006; Copyright © 2009 Thomas Publishing Company; URL—file://C:\Documents and Settings\302013773\Desktop\RFID Tag handles process compone..; 5Pages.

(Continued)

*Primary Examiner* — Brent Swarthout
*Assistant Examiner* — Andrew Bee
(74) *Attorney, Agent, or Firm* — Jennifer E. Haeckl

(57) ABSTRACT

A method for sensing physical, chemical, and biological characteristics of an environment is provided. The method comprises using a radio frequency identification (RFID) sensor component having a predetermined range of power initiation levels and having predetermined resonant circuit parameters comprising the steps of activating the RFID sensor component and determining whether a range of power levels, needed for activating the sensor component, is below the predetermined range of power initiation levels; sensing at least one of the physical, chemical, and biological characteristics of the environment; quantifying the sensed characteristic of the environment using one or more selected resonant parameters, wherein the selection of parameters is based in part on the range of power levels needed to activate the sensor.

19 Claims, 7 Drawing Sheets

OTHER PUBLICATIONS

Davis Shull and Joseph Cordaro; "Wireless for a nuclear facility"; Distributed with permission of author(s) by ISA 2007; 11Pages.
"Radio frequency identification (RFID) systems"; Commission for communications Regulation; web : www.comreg.ie; 22Pages.
"Wright Center of Innovation in the Biosciences"; Food Safety and Biosecurity Center, WCI 06-13—The Ohio State University; 94Pages.

\* cited by examiner

METHODS AND SYSTEMS FOR SENSING UPON RADIATION EXPOSURE

BACKGROUND

The invention relates to methods and systems for sensing comprising one or more radio frequency components.

Generally, manufacturing processes in pharmaceutical and biological fields utilize various disposables or single use items, such as polymeric pouches or bags, tubing, valves, for holding and transferring product in various stages. Such bags are often used to make, store and/or distribute a single batch of drugs, and/or to store a batch of drugs or other material until the batch is ready to be dispensed into vials or bottles for distribution or further storage, or may be dispensed directly into further manufacturing and processing equipment. These bags and disposables generally need to be sterilized, for example using ionizing radiation, such as gamma radiation, prior to use.

Typically, sensors are coupled to such bags to acquire information regarding various environmental parameters in the bags, such as temperature, pressure, pH, oxygen, carbon dioxide, etc. These sensors may also use radio frequency identification (RFID) tags. Conventionally, radio frequency identification (RFID) tags are used for asset tracking. For example, RFID tags may be used for tracking the removal of objects from a location and the replacement of the objects at the location. The RFID tags have been combined with a biometric reader. Such RFID circuit uses certain functional blocks for processing both the biometric signals and the RFID signals. Each RFID tag has a unique factory programmed chip identification (ID) number. These unique numbers are read to relate the RFID tag to the article to which the tag is attached. RFID tags are also used for detecting the unauthorized opening of containers and baggage. RFID tags can be included in a variety of articles such as postage stamps and other mailing labels, garments, and numerous other articles.

However, in certain applications, such as those in which the tag is required to be subjected to radiation, the environment may corrupt or destroy the digital data contents in the memory within the tag. While RFID tags have been known and have been adapted to various uses, such as inventory control and theft protection of items, the RFID tags have been unsuitable for bio bags or disposable items that are gamma radiated for sterilization.

When subjected to radiation, specifically gamma radiation, the contents of the memory elements of the RFID tags can be lost or corrupted resulting in the undesirable alteration of associated data stored therein. However, there are a number of applications, such as, but not limited to, pharmaceutical industry, where irradiation of the system is a requirement to provide an adequate sterilization.

After exposure to gamma irradiation, the device employing the RFID tag apparently continues to function, however, there is an unintended but noticeable and undesirable variation in the performance of the device. For example, corruption of device results in data corruption, which refers to errors or alterations in data that occur during data retrieval, introducing unintended and undesirable changes to the original data. Adverse affects may result in data loss from the electronic device. As used herein, the term "data loss" refers to unrecoverable data unavailability due to hardware or software failure. On the material level, FRAM (Ferroelectric Random Access Memory) is relatively more gamma radiation resistant than EEPROM (Electrically Erasable Programmable Read-Only Memory). However, FRAM also experiences gamma-irradiation effects. The energy of gamma radiation is high enough to potentially cause the displacement damage in the ferroelectric material. For example, after an exposure to a gamma radiation, FRAM experiences the decrease in retained polarization charge due to an alteration of the switching characteristics of the ferroelectric due to changes in the internal fields. This radiation-induced degradation of the switching characteristics of the ferroelectric is due to transport and trapping near the electrodes of radiation-induced charge in the ferroelectric material. Once trapped, the charge can alter the local field around the dipoles, altering the switching characteristics as a function of applied voltage. Depending on the fabrication method of FRAM (for example, sputtering, sol-gel deposition, spin-on deposition, metal-organic chemical vapor deposition, liquid source misted chemical deposition), the trap sites may be at grain boundaries or in distributed defects in the ferroelectric material. In addition to the charge trapping, gamma radiation can also directly alter the polarizability of individual dipoles or domains.

On the device level, the FRAM memory chip of the RFID tag consists of a standard electric CMOS circuitry and an array of ferroelectric capacitors in which the polarization dipoles are oriented during the memory write operation of the FRAM. Radiation damage in CMOS includes, but is not limited to the threshold voltage shift, increased leakage currents, and short-circuit latchup.

Devices that are gamma irradiated, such as in pharmaceutical components, bioprocess industry, and other applications cannot utilize reliably read-write RFID tags such as EEPROM and FRAM tags. Thus, products used in these environments must find alternative solutions or improve existing memory components. For example, in some cases, a simple optical barcode is affixed to the article, and a database is used to store and retrieve the pertinent information associated with that barcode. While this allows the data associated with the article to be retrieved, new data cannot be directly written to the barcode. Instead, it requires a database access, often through a wireless network. An access to the network often can be impossible or unacceptable at certain, yet critical times, for example during process start-up. Thus, critical article manufacturing information (e.g. electronic pedigree) and current end-user information (e.g. start-up conditions) should be stored directly in the memory of the RFID tag attached to the article. Further, when the RFID tag is attached to the article, such local information in the memory of the tag provides the ability for the authentication of the article.

Therefore, it would be desirable to have sensors that could withstand radiation without data loss or corruption.

BRIEF DESCRIPTION

In one embodiment, a method for sensing physical, chemical, and biological characteristics of an environment is provided. The method comprises using an radio frequency identification (RFID) sensor component having a predetermined range of power initiation levels and having predetermined resonant circuit parameters comprising the steps of activating the RFID sensor component and determining whether a range of power levels, needed for activating the sensor component, is more narrow than the predetermined range of power initiation levels; sensing at least one of the physical, chemical, and biological characteristics of the environment; quantifying the sensed characteristic of the environment using one or more selected resonant parameters, wherein the selection of parameters is based in part on the range of power levels needed to activate the sensor.

In another embodiment, a sensor system configured for sensing physical, chemical, and biological characteristics using an RFID sensor component is provided. The sensor system comprises having a predetermined power initiation level. The sensor system further comprises an electronic sensor for sensing the parameter, wherein the electronic sensor is attached to the memory chip of the RFID sensor component, an interrogator unit for reading one or more signals from the sensor corresponding to the characteristics, and a comparator unit for identifying whether a range of power levels, needed for activating the sensor component, is more narrow than the predetermined range of power initiation levels.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
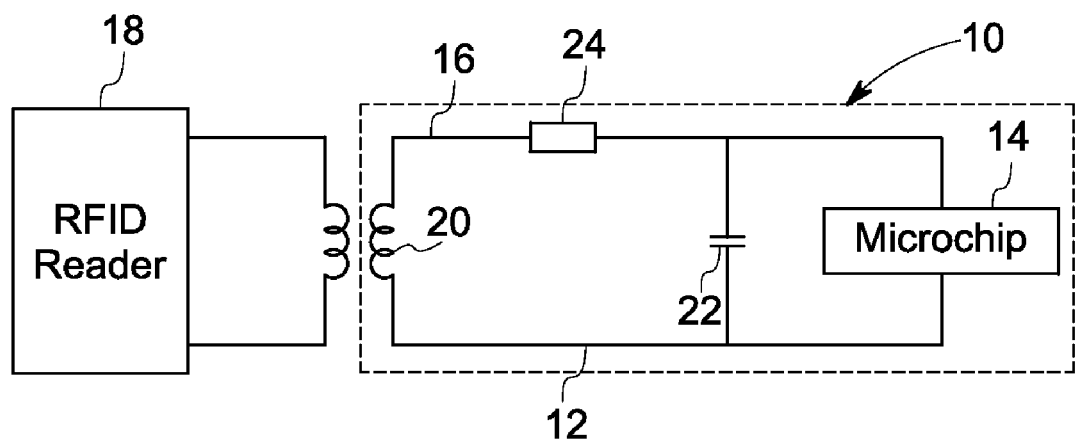
FIG. 1 is a schematic diagram of an embodiment of an RFID system of the invention.

The methods and systems of the invention may be used for sensing physical, chemical, or biological characteristics of an environment using a sensor that comprises a radio frequency identification (RFID) component, such as an RFID tag.

The methods and systems for sensing physical, chemical, and biological characteristics use an RFID sensor having a predetermined range of power initiation levels and one or more resonant responses that can be characterized by resonant circuit parameters. An RFID device that combines a functionality of a tag and a sensor has a predetermined range of needed power to be applied from the RFID interrogator in order to operate the memory chip.

Non-limiting examples of resonant circuit parameters include impedance spectrum, real part of the impedance spectrum, imaginary part of the impedance spectrum, both real and imaginary parts of the impedance spectrum, frequency of the maximum of the real part of the complex impedance (Fp), magnitude of the real part of the complex impedance (Zp), resonant frequency of the imaginary part of the complex impedance ($F_1$), and anti-resonant frequency of the imaginary part of the complex impedance ($F_2$). Additional non-limiting examples of the resonant circuit parameters include parameters that can be extracted from the response of the equivalent circuit of the RFID sensor. The equivalent circuit of the RFID sensor takes into account effects from film material between electrodes, film thickness, electrodes-film contacts, film surface morphology, and substrate-film interface. In one embodiment, an antenna is made in part from material that is responsive to environment. In this embodiment, the antenna is sensitive to the environment and can sense one or more of a chemical, biological or physical parameter. In another embodiment, a sensing film may be applied on top of the antenna. In this embodiment, changes in the film may affect the antenna response. Some other non-limiting examples of these additional parameters include quality factor of resonance, phase angle, and magnitude of impedance of the resonance circuit response of the RFID sensor. Applied multivariate analysis reduces the dimensionality of the multi-variable RFID sensor response to a single data point in multidimensional space for selective quantitation of different environmental parameters of interest. Non-limiting examples of multivariate analysis tools are canonical correlation analysis, regression analysis, nonlinear regression analysis, principal components analysis, discriminate function analysis, multidimensional scaling, linear discriminate analysis, logistic regression, and/or neural network analysis.

Non-limiting examples of gamma-stable RFID tags implemented as gamma-stable sensors include RFID devices operating at a nominal frequency of 13.56 MHz that are fabricated with memory chips MB89R118A or MB89R119A (Fujitsu Corp., Japan) and attached to an antenna. In one example, the size of the antenna may be about 5.5 cm×8.5 cm. The memory chips may be made using a standard 0.35 micrometers complementary metal-oxide semiconductor (CMOS) circuitry process coupled with a process of manufacturing ferroelectric memory. Writing and reading of digital data may be performed using available reader/writer devices (also known as interrogators). Examples of reader/writer devices include Model TRF7960 Evaluation Module (Texas Instruments), Model 111 (Wave Logic LLC, Scotts Valley, Calif.).

As illustrated in FIG. 1, an RFID tag 10 transmits data and energy with the help of magnetically coupled resonance circuit 12. A passive RFID tag does not need a battery for its function and includes a memory micro-chip 14, which is connected to an antenna 16. The micro-chip 14 is read by an RFID reader 18 by illuminating the antenna 16 tuned by a combination of an inductor 20 having an antenna inductance ($L_A$), a capacitor 22 having an antenna capacitance ($C_A$), and a resistor 24 having an antenna resistance ($R_A$). The tuning is done during the fabrication of the sensing antenna. When the RF field passes through an antenna coil, an AC voltage is generated across the coil. This voltage is rectified in the micro-chip 14 to result in a DC voltage for the micro-chip operation. The micro-chip 14 becomes functional when the DC voltage reaches a predetermined level needed to activate and operate the IC memory chip also referred to as operational power level for the purpose of this application. By detecting the RF signal backscattered from the micro-chip, the information stored in the micro-chip can be fully identified. The distance between the passive tag 10 and the reader 18 is governed by the design parameters that include operating frequency, RF power level, reader's receiving sensitivity, size of antenna, data rate, communication protocol, and micro-chip power requirements.

Figure 2:
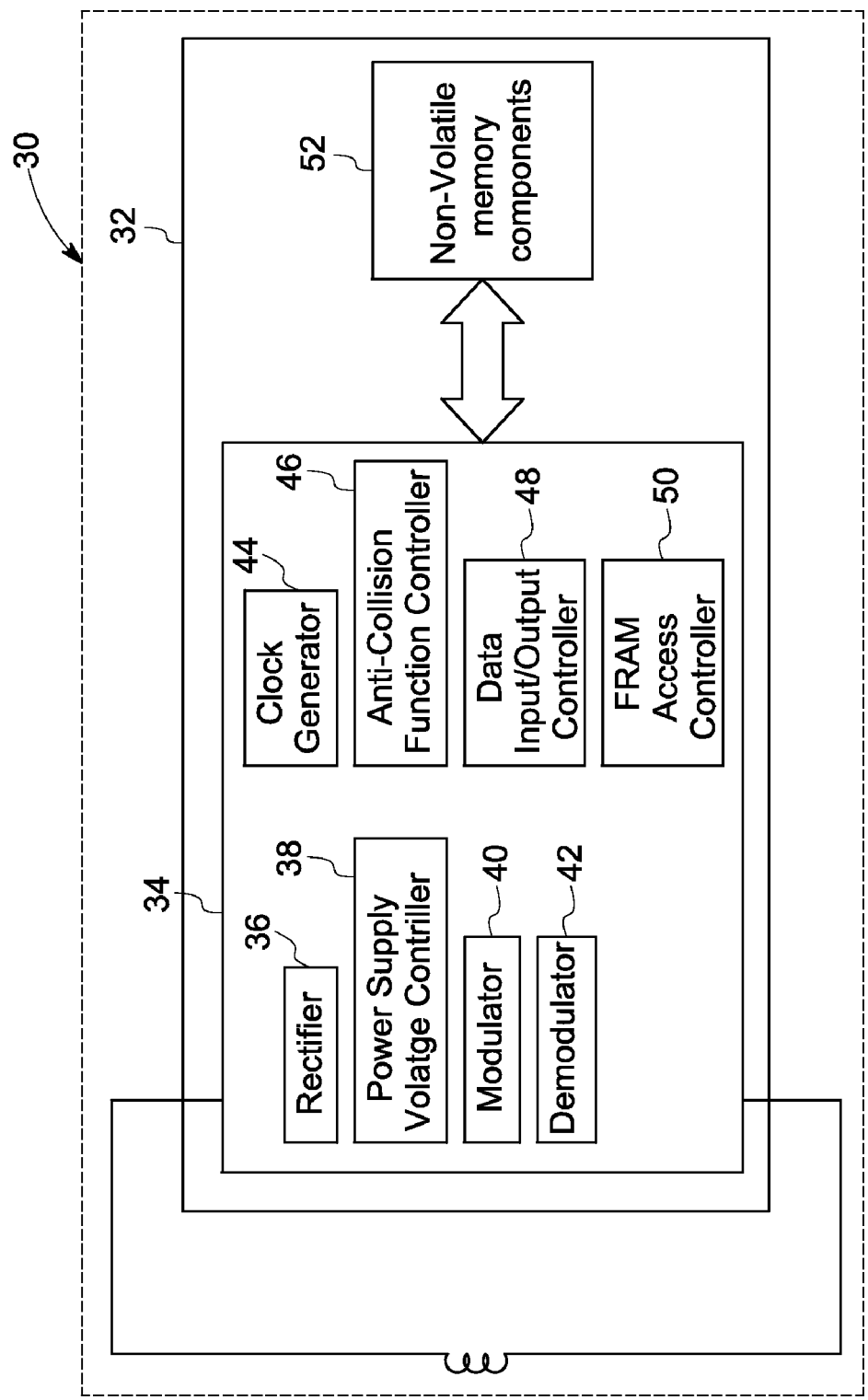
FIG. 2 is a schematic diagram of an embodiment of a memory chip of an RFID tag of the invention.

Referring to FIG. 2, RFID tag 30 comprises a memory chip 32. The memory chip 32 is an integrated circuit device. The integrated circuit (IC) memory chip 32 includes RF signal modulation circuitry fabricated using a complementary metal-oxide semiconductor (CMOS) chip 34 and non-volatile memory components 52. The CMOS chip 34 includes several sub-components, such as a rectifier 36, a power supply voltage controller 38, a modulator 40, a demodulator 42, a clock generator 44, an anti-collision function controller 46, a data input/output controller 48, and an FRAM access controller 50. The memory chip 34 also contains non-volatile memory components 52. One or more of the CMOS components 34 may get affected by gamma radiation during sterilization process.

To activate the chip, an RFID interrogator (reader/writer device) sends an RF signal that is captured by the antenna of the RFID tag creating an AC voltage across the antenna. An on-chip rectifier further converts this AC voltage into a DC voltage that activates the IC chip. The activated chip is capable of sending stored information back to the RFID interrogator and is capable of receiving new information to be stored into its memory. The RFID interrogator uses command pulses to communicate with the chip for reading and writing data. The activated chip is capable of sending stored information back to the RFID interrogator and is capable of receiving new information to be stored into its memory. The RFID interrogator uses command pulses to communicate with the chip for reading and writing data. A comparator unit compares a current value of range of activation power levels with that of the predetermined range of power levels. A processing unit may be employed to adjust one or more of a signal offset, a signal drift, a signal noise, and a slope of a sensor response. In one embodiment, the comparator unit is used to determine a dose of gamma irradiation.

Gamma radiation affects different portions of the RFID tag and sensor circuitry and to a varying extent. The different levels of affect are pronounced in the corruption of the tag and sensor response after gamma irradiation. The methods and systems of the invention corrects for these different levels of gamma radiation-induced effects in the circuitry of the RFID tag.

Figure 3:
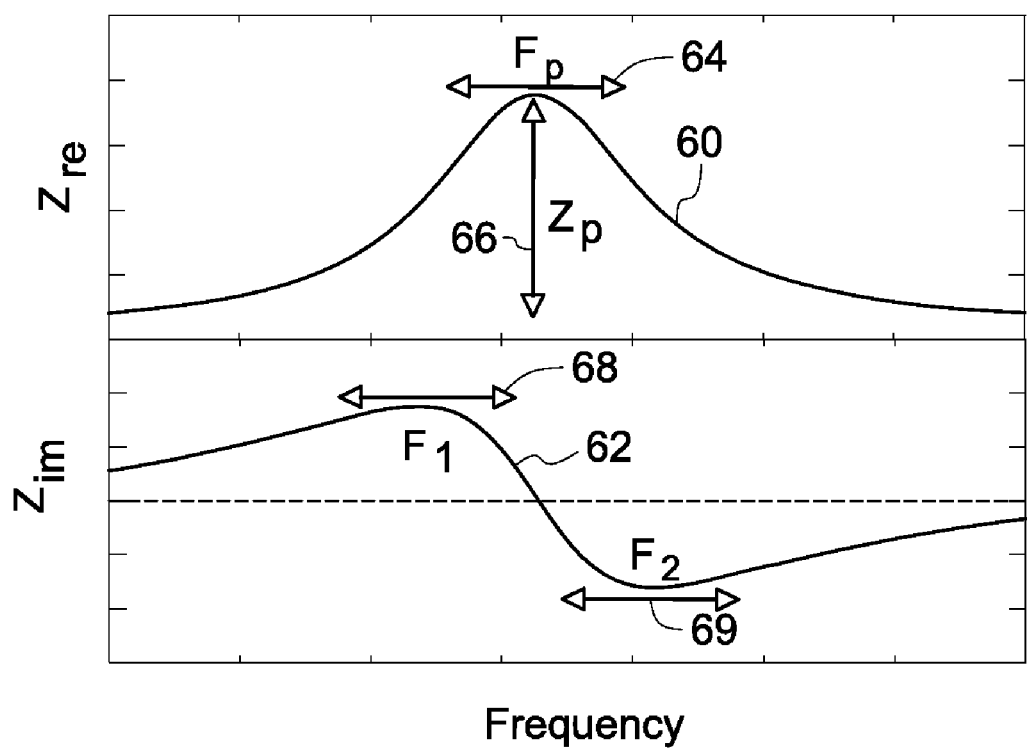
FIG. 3 is a graph of measured parameters of an embodiment of a resonant circuit of a RFID sensor of the invention.

In particular, the combination of components of the tag circuit result in the generation of a complex impedance response formed by resonant circuit parameters such as $F_p$, $Z_p$, $F_1$, $Z_2$ emitted from the tag. FIG. 3 illustrates real and imaginary portions of the complex impedance of the tag. As illustrated by the curve 60, the real part of the complex impedance includes parameters $F_p$ 64 and $Z_p$ 66. The parameter $F_p$ 64 represents frequency of the maximum of the real part of the complex impedance, and the parameter $Z_p$ 66 represents magnitude of the real part of the complex impedance. Similarly, as illustrated by the curve 62, the imaginary part of the complex impedance includes $F_1$ 68 and $F_2$ 69. The parameter $F_1$ 68 represents resonant frequency of the imaginary part of the complex impedance, and the parameter $F_2$ 69 represents antiresonant frequency of the imaginary part of the complex impedance. The parameters $F_1$ and $F_2$ are related to different components of the equivalent circuit. Additional non-limiting examples include parameters that can be extracted from the response of the equivalent circuit of the RFID sensor, for example quality factor of resonance, phase angle, and magnitude of impedance of the resonance circuit response of the RFID sensor and others known in the art.

In one embodiment, an RFID interrogator (reader/writer device) is used to interrogate the RFID device with RFID sensor component and to determine the range of power levels needed to activate IC memory chip. Gamma irradiation changes the power read range of RFID tags before and after irradiation. Gamma irradiation of the RFID device narrows the power read range. This narrowing of the range is associated with radiation-induced changes in the performance of CMOS structure of the IC memory chip. Thus, if the range of power levels is less (more narrow) than predetermined range of power levels, a group of impedance parameters of RFID device (first set) is selected to provide a response between the measured sensor parameters and the environmental parameter to be quantified. In one example, the parameters in the second set may include Fp, Zp and some others. Whereas, when the range of power levels is very close to the predetermined range of power levels, a group of impedance parameters of RFID device (second set) is selected to provide a response between the measured sensor parameters and the environmental parameter to be quantified. In one example, the parameters in the second set may include $F_1$, $F_2$, Fp, Zp.

In another embodiment, an RFID tag that is exposed to gamma radiation sterilization may have a memory chip with at least one analog input where a separate sensor is attached to the analog input of the memory chip. An RFID interrogator (reader/writer device) is used to interrogate the RFID device with the attached sensor and to determine the range of power levels needed to activate the IC memory chip. As noted, gamma irradiation of the RFID device narrows the power read range. Thus, if the range of power levels is less (more narrow) than predetermined range of power levels, the value of the electrical analog input of the memory chip after the gamma irradiation is adjusted with an adjustment coefficient until is matches the value of the electrical analog input of the memory chip that was recorded before the gamma irradiation and stored in the memory of the chip. This adjustment coefficient is related to the value of the electrical analog input of the memory chip before and after gamma irradiation and is a multiplicative coefficient, additive coefficient, a polynomial coefficient or a combination of these coefficients.

Figure 4:
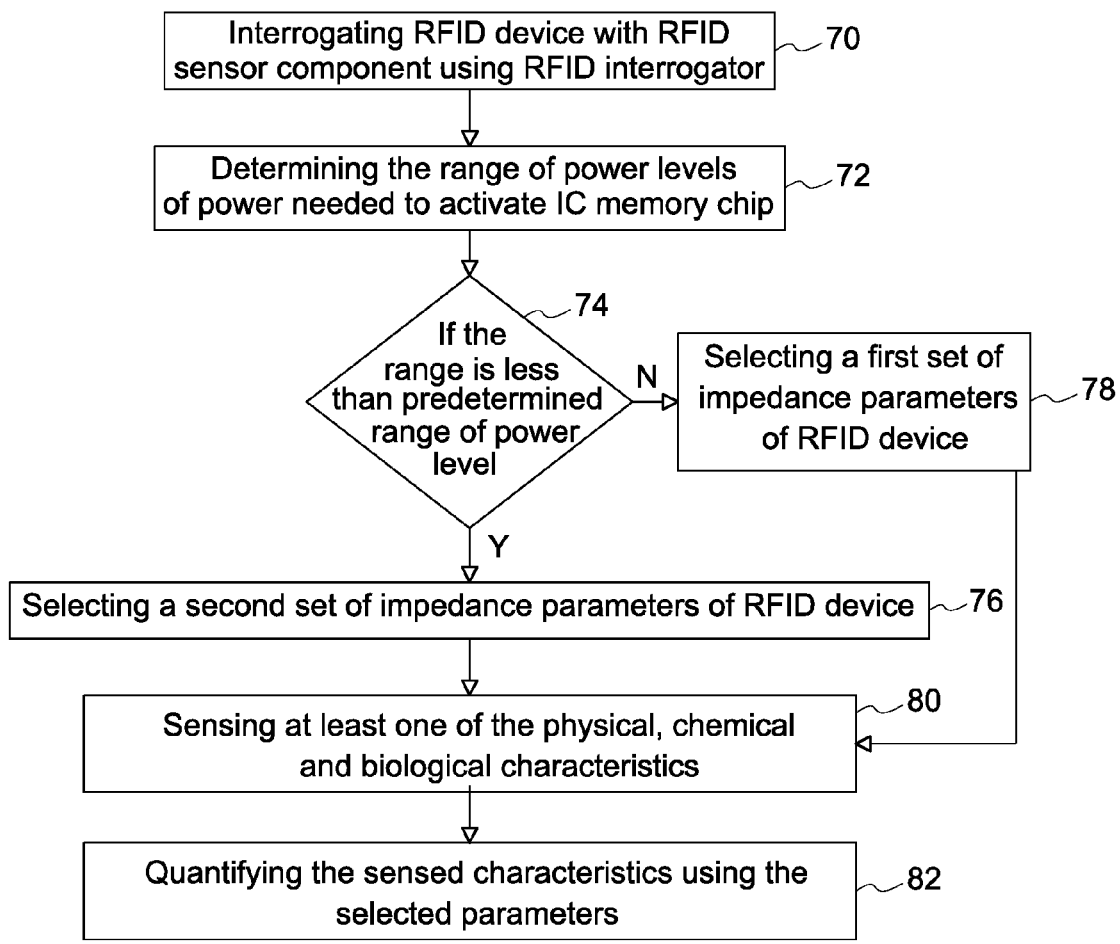
FIG. 4 is a flow chart of the steps of an example method of the invention for measuring the environmental parameters using an RFID sensor.

FIG. 4 illustrates a method of the invention for accommodating the changes caused in the RFID circuitry upon gamma radiation. At block 70, power from the RFID interrogator is applied to activate the memory chip of the sensor. When the RF field sent by the RFID interrogator passes through an antenna coil, an AC voltage is generated across the coil. This voltage is rectified in the microchip to result in a DC voltage for the microchip operation. The microchip becomes functional when the DC voltage reaches a predetermined level needed to activate and operate the IC memory chip also referred to as operational power level for the purpose of this application. By detecting the RF signal backscattered from the microchip, the information stored in the micro-chip can be fully identified. At block 72, the range of power level required to activate the memory chip of the sensor is determined. At block 74, a decision is made whether the range of power level required to activate the memory chip of the sensor is more narrow than the predetermined range of power initiation levels. In one embodiment, a change in the power level may be caused by exposure of the sensor component to gamma radiation.

In instances where a range of power levels needed to activate the memory chip is less (narrower) than the predetermined range of power levels (at block 76), only a subset of the sensing parameters is selected to calculate the level of the environmental parameter. The parameters that are not selected for the calculations of the level of the environmental parameters may be the ones that are affected by the gamma irradiation. In other instances, where the range of power levels needed to activate the memory chip is the same as the predetermined range of power levels (block 78), one or more of the parameters, such as $F_1$, $F_2$, $F_p$, $Z_p$, are selected to calculate the level of the environmental parameter. Further, at block 80, the sensor having the RFID sensor component senses at least one of the physical, chemical, and biological characteristics of the environment.

At block 82, the sensed characteristic is quantified by the sensor using one or more of the selected resonant parameters, wherein the selection of parameters is based in part on the range of power level needed to activate the memory chip of the sensor, as described above with regard to blocks 74, 76 and 78. In one embodiment the step of quantifying the sensed characteristic comprises applying a correction scheme to adjust for one or more of a signal offset, a signal drift, a signal noise, and a slope of a sensor response. In one embodiment, calibration parameters of the one or more signals may be stored in a memory of the RFID device, and the calibration parameters may be retrieved when the correction scheme is to be applied. In another embodiment, calibration parameters of the one or more signals may be stored in a database, and the calibration parameters may be retrieved when the correction scheme is to be applied.

In one embodiment, the adjustment coefficient may be related to a value of the respective signal before and after gamma irradiation. The adjustment coefficient may be a multiplicative coefficient, additive coefficient, a polynomial coefficient, or a combination thereof. In one example, the data relating to the sensed characteristics is stored, and retrieved at a later stage when the characteristic is quantified by the sensor.

In one embodiment, the adjustment coefficient may be related to a value of the respective signal before and after gamma irradiation and may be used to determine the dose of gamma irradiation.

In one example, the sensor or the RFID tag comprises radiation-hardened components. In addition to applying the method illustrated in the flow chart of FIG. 4, in certain embodiments, sensor performance is improved by applying gamma radiation-hardened CMOS components of semiconductor memory of the tag. The examples of hardened-by-design CMOS components include p-channel transistors in memory array, annular n-channel gate structures, p-type guard rings, robust/redundant logic gates protecting latches, and latches immune to single event effects. The hardened-by-design techniques prevent radiation-hard latches from being set by single event transients propagating through the logic of the device.

EXAMPLE

RFID sensors were fabricated with FRAM memory chips MB89R118A (Fujitsu Corp., Japan). These chips are made using a standard 0.35-μm CMOS circuitry coupled with the ferroelectric memory. The total memory of the MB89R118A chips is 2000 bytes. The FRAM memory chips were integrated into RFID tags. Writing and reading of digital data was performed using a Reader/Writer from Wave Logic LLC (Scotts Valley, Calif.). Measurements of the complex impedance of the radio frequency based sensor were performed with a network analyzer (Model E5062A, Agilent Technologies, Inc. Santa Clara, Calif.) under computer control using LabVIEW. The network analyzer was used to scan the frequencies over the range of interest and to collect the complex impedance response from the RFID sensors. The collected complex impedance data was analyzed using Excel (MicroSoft Inc. Seattle, Wash.) or KaleidaGraph (Synergy Software, Reading, Pa.) and PLS_Toolbox (Eigenvector Research, Inc., Manson, Wash.) operated with Matlab (The Mathworks Inc., Natick, Mass.).

Sensing of temperature was achieved by using an RFID tag and monitoring the dependence of the frequency response as a function of temperature. Two identical tags were used. The first RFID sensor was not exposed to gamma radiation. The second RFID sensor was exposed to about 35 kGy of gamma radiation. The sensors were exposed to different temperatures in the range from 70° C. to 30° C. in the steps of 5° C.

Figure 5:
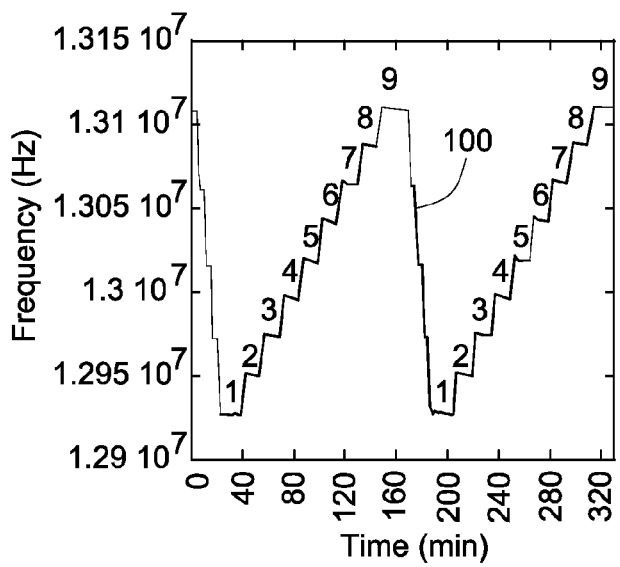
FIGS. 5-7 illustrate an example of $F_1$, $F_2$ and Fp responses from a RFID sensor that is not exposed to gamma radiation.
Figure 6:
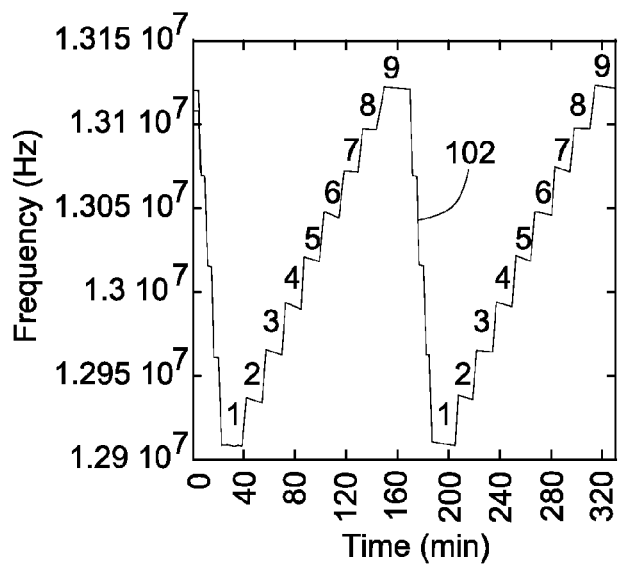
Figure 7:
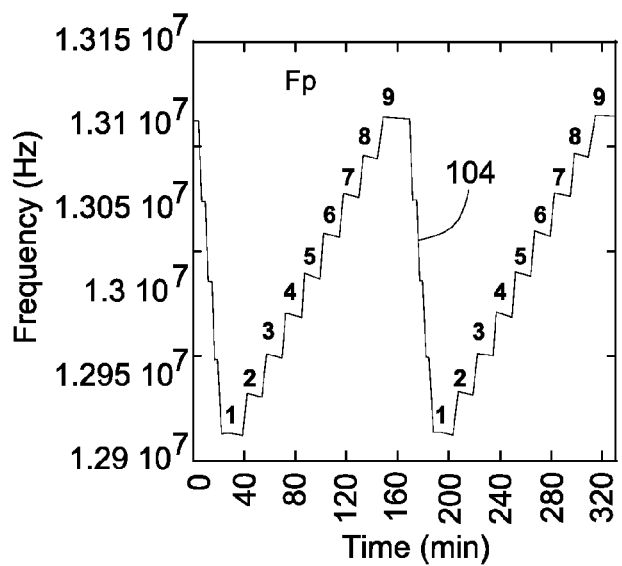

FIGS. 5-7 show the results of measurements of responses $F_1$, $F_2$, and Fp of the first RFID sensor that was not exposed to gamma radiation. Steps 1-9 of the graphs 100, 102 and 104 show temperature changes from 70° C. to 30° C. in the steps of 5° C. As shown in FIGS. 5-7 the responses $F_1$, $F_2$, and Fp track well the temperature changes of the sensor making possible the use of the frequency shifts for reliable temperature measurements.

Figure 8:
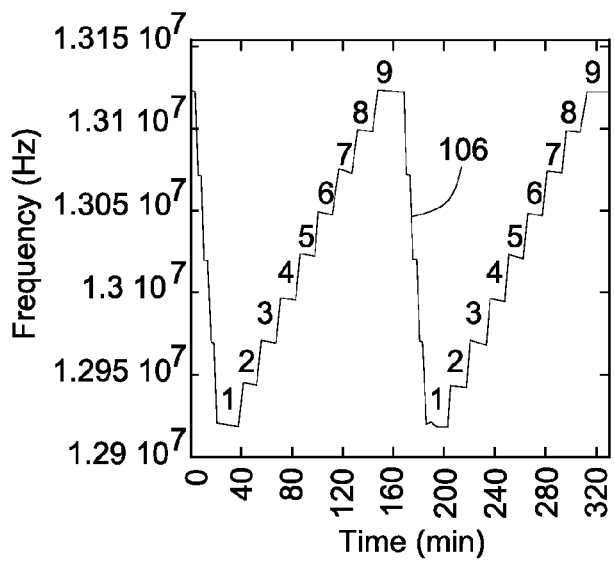
FIGS. 8-10 illustrate an example of $F_1$, $F_2$ and Fp responses from a RFID sensor that is exposed to gamma radiation.
Figure 9:
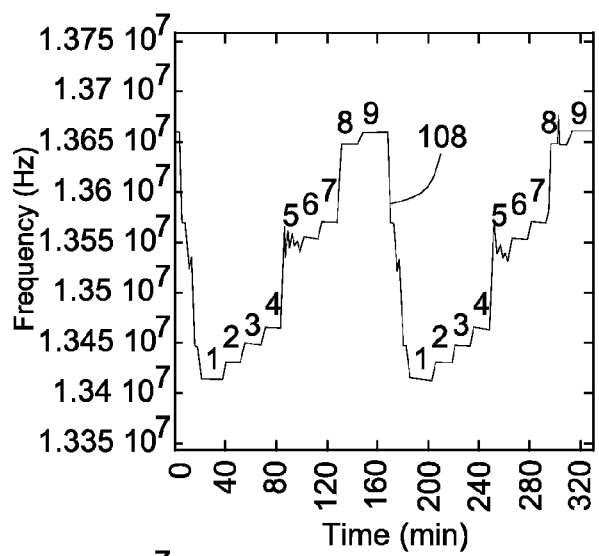
Figure 10:
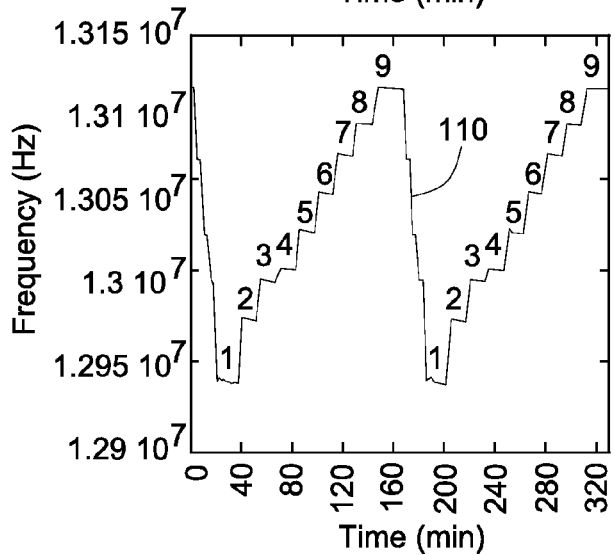

FIGS. 8-10 show results of measurements of responses $F_1$, $F_2$, and Fp of the second RFID sensor that was exposed to gamma radiation. Steps 1-9 of the graphs 106, 108 and 110 represent temperature changes from 70° C. to 30° C. in the steps of 5° C. As shown in FIG. 8, response $F_1$ was not affected by gamma radiation. As illustrated, $F_1$ response is still well correlated with temperature changes of the sensor. However, response $F_2$ response (FIG. 9) was significantly affected by gamma radiation making impossible to use $F_2$ response for reliable temperature measurements. As a result, Fp response (FIG. 10) was, to a smaller extent, also affected by gamma radiation. Thus, gamma radiation affected portions of the memory chip of the RFID tag of the second sensor by changing the response properties of the circuitry. Such changes in the response provide significant errors in sensor response.

Figure 11:
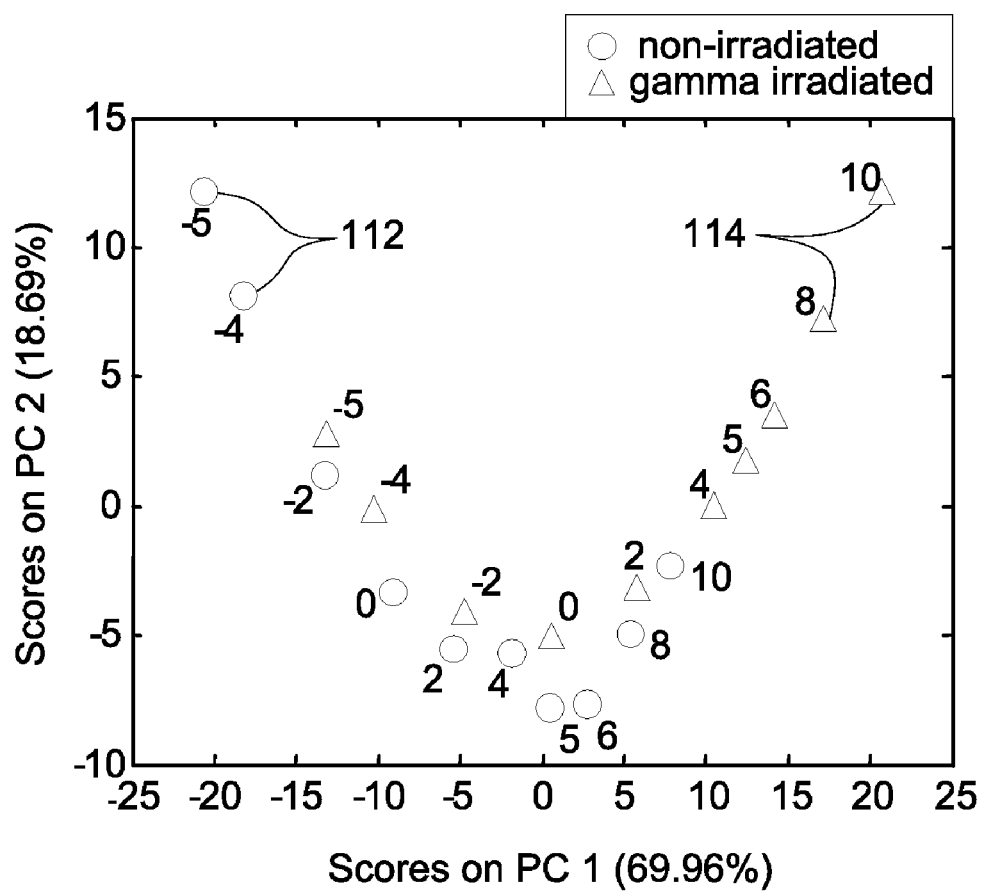
FIG. 11 is a graph of the result of an example of the principal components analysis of the complex impedance spectra of an RFID sensor before and after gamma irradiation.

To activate a memory chip of a RFID sensor, a correct amount of radio frequency (RF) energy must be applied to the RFID tag of the sensor. The energy required to activate the memory chip is pronounced in the changes in the frequency response of the RFID tag. Measurements of activation of the RFID tags were performed at different power levels of a network analyzer ranging from about −5 dBm to about +10 dBm. Such measurements were performed with RFID tags before and after the gamma irradiation. The measured spectral profiles were further processed using principal components analysis (PCA) tools in order to compare the shapes of the frequency spectra. The principal components analysis projects the data set onto a subspace of lower dimensionality with removed co-linearity. In PCA, the variance of the data matrix is presented as the weighted sums of the original variables, in other words principal components (PCs), with no significant loss of information. FIG. 11 shows the results of principal components analysis of frequency response of a RFID tag before and after gamma irradiation. The points 112 represent the data points prior to exposure of the sensor to the gamma radiation, and points 114 represent the data point after exposure to the gamma radiation. The difference in the position of data points 112 and 114 illustrate that upon gamma irradiation, the shapes of the frequency spectra are dramatically changed.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A method for sensing physical, chemical, and biological characteristics of an environment using a radio frequency identification (RFID) sensor component having a predetermined range of power initiation levels and having resonant circuit parameters comprising the steps of:

activating the RFID sensor component and determining whether a range of power levels, needed for activating the sensor component, is more narrow than the predetermined range of power initiation levels;

sensing at least one of the physical, chemical, and biological characteristics of the environment;

quantifying the sensed characteristics of the environment using one or more selected resonant parameters, wherein the selection of parameters is based in part on the range of power levels needed to activate the sensor, wherein a change in the range of power levels that is needed to activate the sensor, is caused by exposure of the sensor component to gamma radiation.

2. The method of claim 1, wherein the selected resonant parameters from the RFID sensor comprise parameters calculated from a complex impedance response of the RFID sensor, the real part of the complex impedance response of the RFID sensor, an imaginary part of the complex impedance response of the RFID sensor.

3. The method of claim 1, wherein the selected resonant parameters from the RFID sensor comprise paramaters calculated from a resonance response of the RFID sensor associated with an equivalent circuit of the RFID sensor.

4. The method of claim 1, wherein quantifying the sensed physical, chemical, and biological characteristics of the enviromnent comprises relating the sensed characteristics to the selected resonant parameters from the RFID sensor through transfer functions with coefficients stored in a memory chip of the RFID sensor.

5. The method of claim 1, where an antenna of the RFID sensor is sensitive to the enviroment.

6. The method of claim 1, wherein if the range of power levels is more narrow than a predetermined threshold, then the selected parameters consist of one or more of $F_p, Z_p, F_1, F_2$ parameters calculated from a complex impedance response.

7. The method of claim 1, if the range of power levels is not more narrow than a predetermined threshold, then the selected parameters consist of one or more of $F_1, F_2, F_p, Z_p$ parameters calculated from a complex impedance response.

8. The method of claim 1, wherein if the range of power levels is more narrow than a predetermined threshold, then the selected parameters consist of a group of parameters calculated from a complex impedance response and if the range of power levels is not more narrow than a predetermined threshold, then the selected parameters consist of another group of parameters calculated from a complex impedance response.

9. The method of claim 1, wherein the step of quantifying the sensed characteristics comprises applying a correction scheme to adjust for one or more of a signal offset, a signal drift, a signal noise, and a slope of a sensor response.

10. The method of claim 9, further comprising storing calibration parameters of one or more signals in a memory of an RFID device, and retrieving the calibration parameters when the correction scheme is to be applied.

11. The method of claim 9, further comprising storing calibration parameters of one or more signals in a database, and retrieving the calibration parameters when the correction scheme is to be applied.

12. The method of claim 1, wherein a memory chip of the RFID sensor comprises a ferro-electric memory device.

13. The method of claim 1, wherein a dose of gamma irradiation is determined from values of the respective signals before and after gamma irradiation.

14. A sensor system configured for sensing physical, chemical, and biological characteristics, using an RFID sensor component having a predetermined range of power initiation levels, and having resonant circuit parameters comprising:
an electronic sensor for sensing the characteristics, wherein the electronic sensor employs the RFID sensor component;
an interrogator unit for reading one or more signals from the sensor corresponding to the characteristics; and
a comparator unit for identifying whether a range of power levels, needed for activating the sensor component, is more narrow than the predetermined range of power initiation levels, for determining whether a change in the range of power levels, that is needed to activate the sensor, is caused by exposure of the sensor component to gamma radiation, and for quantifying the sensed characteristics using one or more selected resonant parameters, wherein the selection of parameters is based in part on the range of power levels needed to activate the sensor.

15. The sensor system of claim 14, further comprising a processing unit for adjusting for one or more of a signal offset, a signal drift, a signal noise, and a slope of a sensor response.

16. The sensor system of claim 14, wherein the sensor is coupled to a RFID tag to send the one or more signals from the sensor to a receiver unit.

17. The sensor system of claim 14, wherein the sensor comprises radiation-hardened components.

18. The sensor system of claim 14, wherein the sensor comprises a ferro-electric memory device.

19. The sensor system of claim 14, wherein the comparator unit is used to determine a dose of gamma irradiation.

* * * * *